United States Patent [19]
Yoshida

[11] Patent Number: 5,148,202
[45] Date of Patent: Sep. 15, 1992

[54] DISPLAY DEVICE WITHIN FINDER FOR CAMERA

[75] Inventor: Yukata Yoshida, Tokyo, Japan

[73] Assignee: Fuji Photo Film Co., Ltd., Minami-ashigara, Japan

[21] Appl. No.: 696,292

[22] Filed: Apr. 26, 1991

Related U.S. Application Data

[63] Continuation of Ser. No. 543,653, Jun. 26, 1990, abandoned.

[30] Foreign Application Priority Data

Jun. 30, 1989 [JP] Japan ................................ 1-170823
Jul. 13, 1989 [JP] Japan ................................ 1-181442

[51] Int. Cl.⁵ .............................................. G03B 13/10
[52] U.S. Cl. ............................. 354/222; 354/289.12; 354/474
[58] Field of Search ................... 354/195.1, 219, 222, 354/409, 127.13, 289.12, 474

[56] References Cited

U.S. PATENT DOCUMENTS

| | | | |
|---|---|---|---|
| 4,478,493 | 10/1984 | Yokota | 354/222 X |
| 4,639,111 | 1/1987 | Harvey | 354/195.1 X |
| 4,682,870 | 7/1987 | Atkinson | 354/222 X |
| 4,692,008 | 9/1987 | Arakawa et al. | 354/289.12 X |

*Primary Examiner*—Michael L. Gellner
*Attorney, Agent, or Firm*—Curtis, Morris & Safford

[57] ABSTRACT

An electro-optical display panel is disposed within a finder in order to provide an alarm display and/or a display of camera operation state. If lens barriers are closed or a proper exposure control or focal adjustment is not possible, the electro-optical display panel is made in a light intercepting state, and the optical path of the finder is closed. According to a preferred embodiment, the electro-optical display panel is constructed of a plurality of display segments. The display segments are selectively driven to change their light transmitting state and display the shutter operation and/or film transportation state.

26 Claims, 13 Drawing Sheets

DISPLAY DEVICE WITHIN FINDER FOR CAMERA

This application is a continuation of application Ser. No. 543,653, filed Jun. 26, 1990, now abandoned.

BACKGROUND OF THE INVENTION

The present invention relates to a display device mounted within a camera finder, and more particularly to an electro-optical display panel mounted within a finder to provide a display of the operation conditions of camera mechanisms and an alarm display.

As a display device of a recent camera, there is widely used an electro-optical display device, such as a liquid crystal display panel, whose transmittance changes with an applied electric signal. As described e.g. in Japanese Patent Laid-Open Publication No. 60-102615, there is known a display device which has a liquid crystal display panel mounted within the finder and allows a user to observe not only a subject, but also photographing information and the like. A conventional display device mounts such an electro-optical display panel outside a field frame so as not to superpose a displayed image upon a subject image. Accordingly, a space for mounting a display panel is required at the position around the field frame, which is a disadvantage in making a compact camera.

OBJECTS OF THE INVENTION

It is therefore a principal object of the present invention to provide a display device capable of mounting within a finder without a need of a specific space.

It is another object of the present invention to provide a display device capable of presenting a display of the operation conditions of a camera and an alarm display, easily recognizable by a user.

SUMMARY OF THE INVENTION

In order to achieve the above and other objects, and advantages of the present invention, an electro-optical display panel is mounted within a finder optical system, the electro-optical display panel is switched between a light transmitting (transparent) state and light intercepting (opaque) state, and at least a portion of the finder optical path is closed to provide an alarm display and a display of the operation conditions of camera mechanisms. According to a preferred embodiment of this invention, an electro-optical display panel is a liquid crystal display panel having a plurality of display segments and mounted traversing the finder optical path. If proper photographing conditions are met, the liquid crystal display panel is made transparent so that a subject can be observed through the finder. On the other hand, if photographing cannot be allowed or is to result in an improper image, the liquid crystal display panel is made opaque so that a subject cannot be observed through the finder. The operation conditions of camera mechanisms such as a shutter device and a film transporting device are analogously displayed by changing the size of a transparent region of the liquid crystal display panel between two conditions. In a first condition, the whole area of the finder optical path is made in a light intercepting state, and in a second condition, the whole area thereof is made in a light transmitting state.

According to the present invention, there is no need of providing a space around the finder optical system to mount the electro-optical display panel, thereby solving the problem of a large sized finder. The display device of this invention allows a large display image easily recognizable within a limited area of the finder screen, and allows to monitor the operation conditions of camera mechanisms.

BRIEF DESCRIPTION OF THE INVENTION

The above and other objects, and advantages of the present invention will become apparent from the following detailed description when read in conjunction with the accompanying drawings, in which.

DETAILED DESCRIPTION OF THE INVENTION

Figure 1:
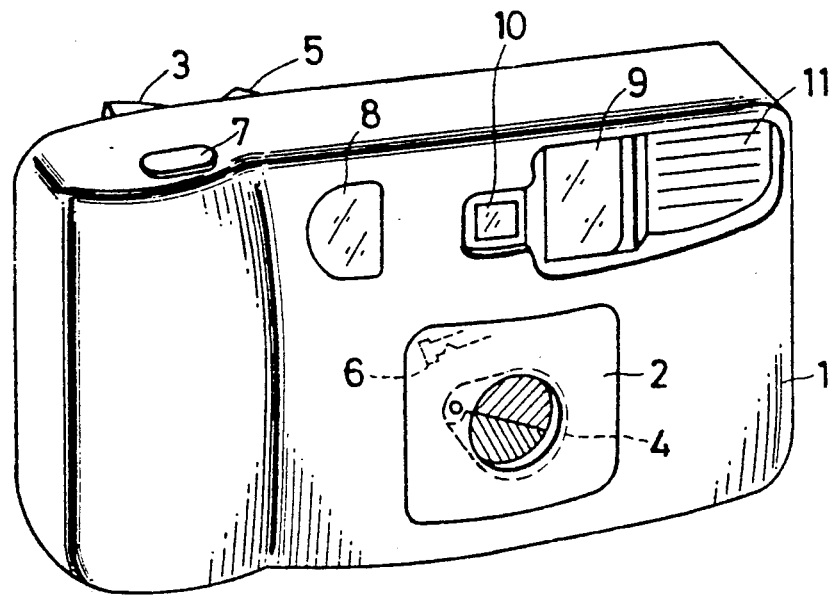
FIG. 1 is an external view of a camera embodying the present invention.

Referring to FIG. 1 showing the external view of a camera, on the front side of a camera housing 1 there is mounted a lens barrel 2 which is movable in the direction perpendicular to the camera front surface. The lens barrel 2 moves along its optical axis as a zoom knob 3 at the back side of the camera housing 1 is manipulated, thereby changing the focal length of a zoom lens mounted within the lens barrel 2 as a taking lens. Two lens barriers 4 mounted on the lens barrel 2 cover the front of the taking lens when the camera is not used. The lens barriers 4 are open and closed upon actuation of an open/close knob 5 mounted on the back side of the camera housing 1. When the lens barriers 4 are open, a barrier switch 6 turns on. A shutter button 7 is mounted on the upper side of the camera housing 1, and at the front side there are also mounted a projector window 8 and photodetector window 9 for use in range finding. Reference numerals 10 and 11 represent a finder window and a flash emitting unit, respectively.

Figure 2:
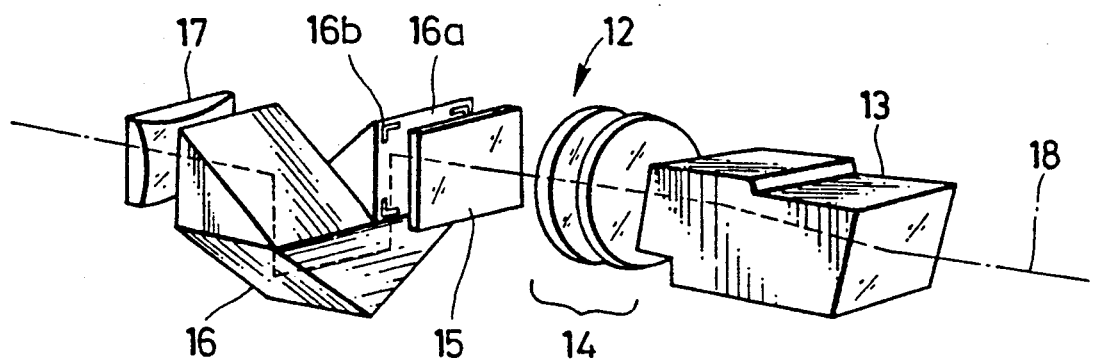
FIG. 2 is a perspective view showing an example of the finder optical system built into the camera shown in FIG. 1.

At the back of the finder window 10, there is disposed a finder optical system 12 of a real image type as shown in FIG. 2. This finder optical system 12 is constructed of a parallax compensation prism 13, objective lens 14, transmission type liquid crystal display panel 15, porro prism 16, and eye piece 17. A luminous flux incident to the objective lens 14 via the prism 13 is focussed at the entrance surface 16a of the porro prism 16. A focussed image on the surface 16a is observed via the porro prism 16 and eye piece 17. The entrance surface 16a has field frame marks 16b recorded thereon which as well as a finder image can be observed clearly. The liquid crystal display panel 15 is disposed in contact with the entrance surface 16a of the porro prism 16 so that an image displayed on the liquid crystal display panel 15 can be observed with least difference in diopter relative to a finder image. Reference numeral 18 represents the optical axis of the finder optical path.

Figure 3:
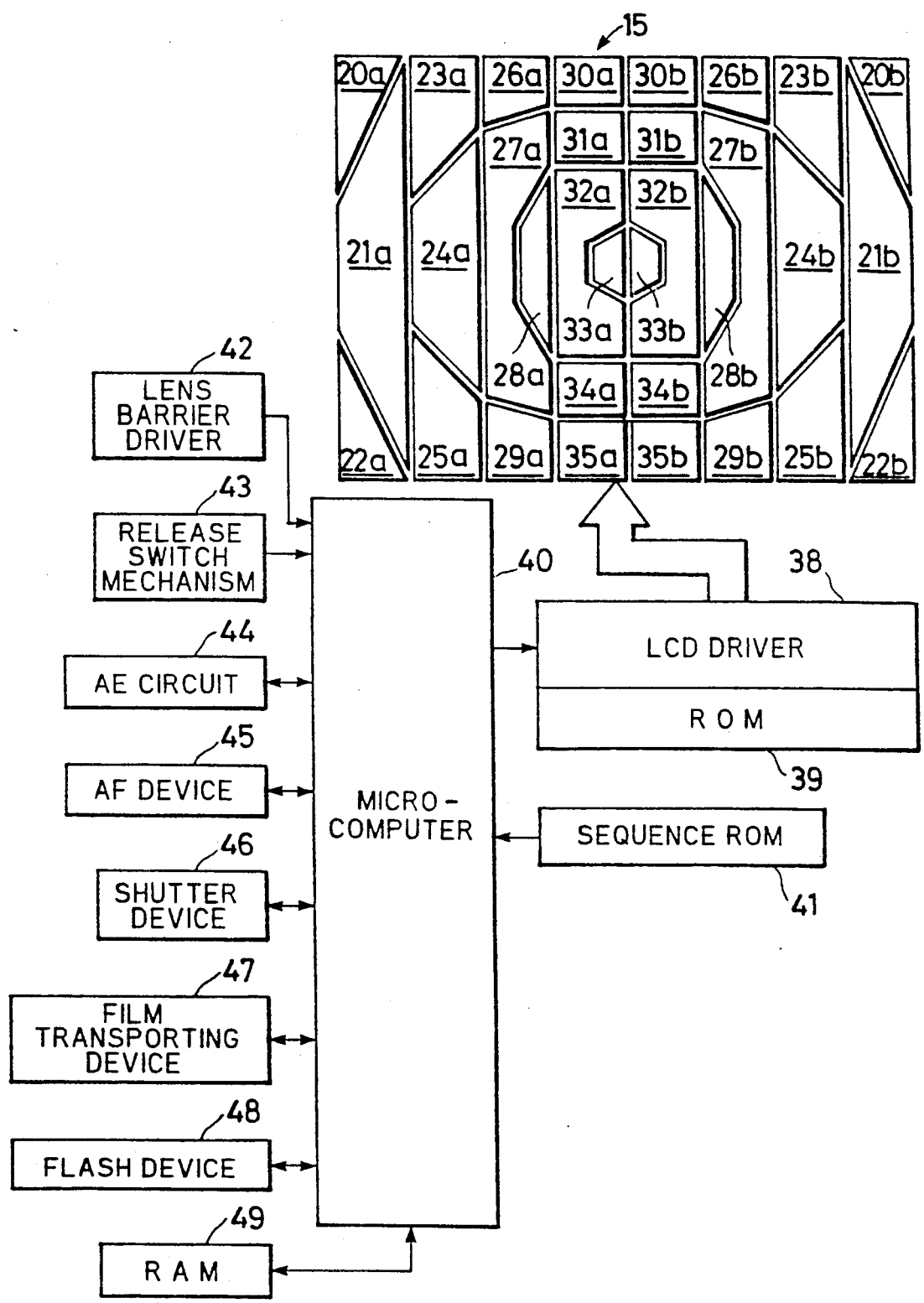
FIG. 3 is a block diagram of an electric circuit equipped within the camera shown in FIG. 1.

Referring to FIG. 3 showing the electric circuit arrangement used with this embodiment, the transmission type liquid crystal display panel 15 is constructed of thirty-two display segments 20a to 35a, and 20b to 35b symmetrically disposed right and left and driven by an LCD driver 38. The display segments in this embodiment is formed in columnar separation of concentric ellipses or circles. The display segments are each independently driven upon voltage application from the LCD driver 38. Each display segment has a high transmittance and becomes transparent when no voltage is applied, whereas it has a low transmittance and becomes opaque when voltage is applied. The LCD driver 38 has a dedicated ROM 39 which stores data for driving the liquid crystal display panel 15 and displaying predetermined display patterns.

A microcomputer 40 executes operation sequences of the camera in accordance with programs stored in a sequence ROM 41, to thereby control the operations of a lens barrier driver 42, release switch mechanism 43, AE circuit 44, AF device 45, shutter device 46, film transporting device 47, and flash device 48. Various measured data during execution of the camera operation sequence are written in RAM 49 as necessary, and read by the microcomputer 40 when necessary.

The lens barrier driver 42 opens/closes the lens barriers 4 and supplies to the microcomputer 40 the switching data of the barrier switch 6 which is turned on and off as the lens barriers open and close. The release switch mechanism 43 detects a depression of the shutter button 7 and supplies to the microcomputer 40 a half-depression signal and full-depression signal. The AE circuit 44 measures the brightness of a subject and calculates a shutter speed in accordance with the measured values. In this embodiment, a program shutter device is used so that the exposure amount can be controlled in accordance with a calculated shutter speed.

The AF device 45 starts a range finding operation upon reception of a command from the microcomputer 40. Specifically, a spot-like near-infrared beam is radiated from the projector window 8 toward a subject, and the reflected beam at the subject becomes incident to the photodetector window 9. At the back of the photodetector window 9, a photosensor is disposed as well known in the art. A distance to a subject is measured on the basis of the incident position of the reflected beam at the photosensor, and the data representative of the subject distance are written in the RAM 49. The distance data are read from the RAM 49 when photographing to thereby adjust the focus of the taking lens. The distance data are also used for the flashmatic control to be described later.

Figure 4:
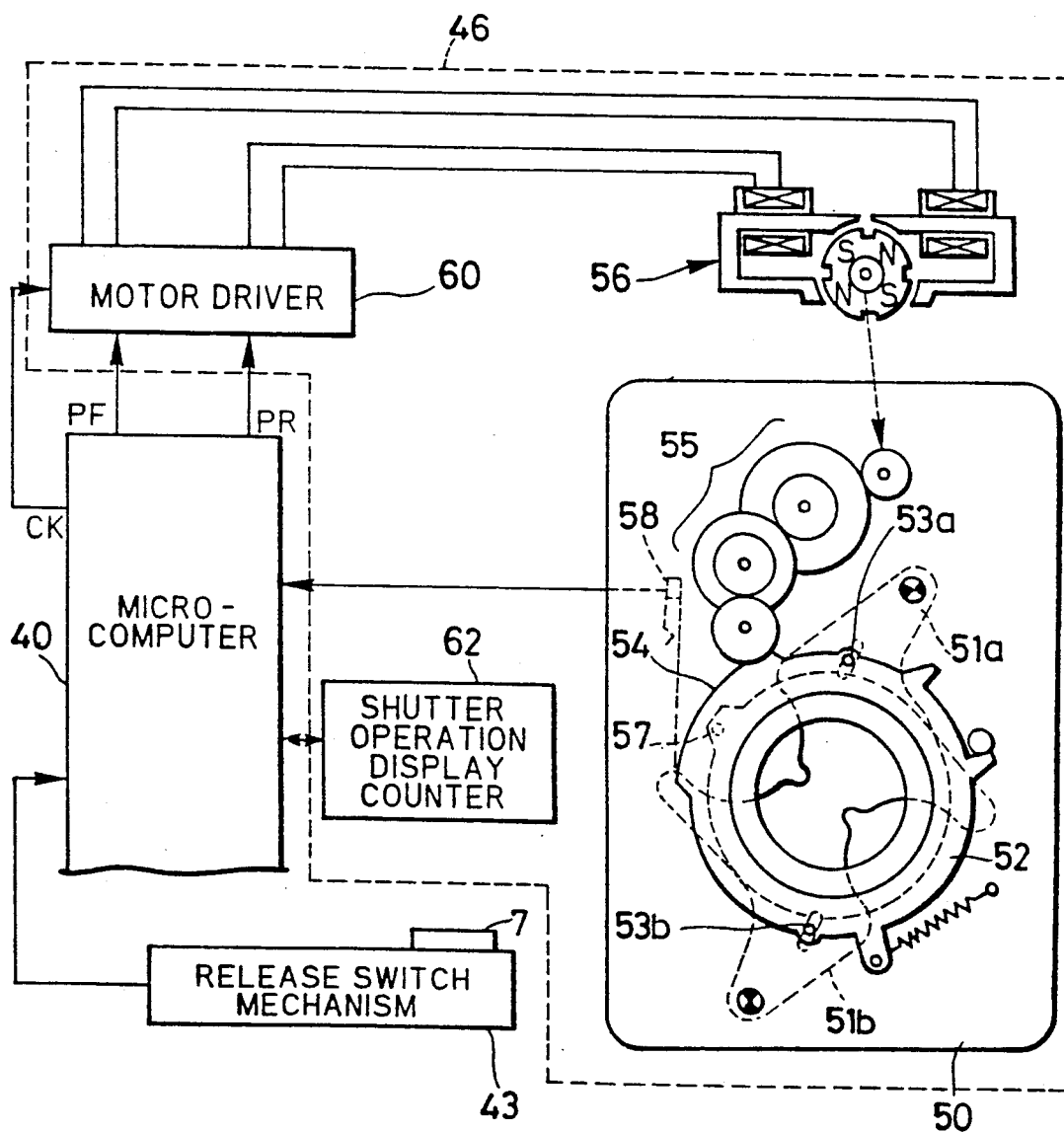
FIG. 4 is a schematic diagram showing the shutter device.

The shutter device 46 controls the shutter blades serving also as the diaphragm, in accordance with a shutter speed calculated by the AE circuit 44. Referring to FIG. 4 showing the outline of this program shutter device 46, a pair of shutter blades 51a and 51b are mounted on a shutter base plate 50 by means of shafts, and formed with slots with which pins 53a and 53b of a driving ring 52 are engaged. As the driving ring 52 rotates in the clockwise direction against a spring force, the shutter blades 51a and 51b rotate to be open. As the driving ring 52 rotates in the counter-clockwise direction, they rotate and are closed.

The driving ring 52 is rotated by a stepping motor 56 whose rotation force is transmitted via a gear train 55 to a gear section 54 formed on the driving ring 52. As shown in FIG. 4, the shutter blades 51a and 51b partially overlap each other when they are in a closed state. As the driving ring 52 rotates by a predetermined angle and when a pin 57 turns a timing switch 58 on, an exposure starts and continues while the timing switch 58 is maintained on.

The stepping motor 56 is driven by a motor driver 60 which is supplied with driving clock pulses CK, rotation direction designating signals PF and PR from the microcomputer 40. With the PF signal being "1" and PR signal "0", the stepping motor 56 rotates in the normal direction to open the shutter blades 51a and 51b. With the PF signal being "0" and PR signal "1", the stepping motor 56 rotates in the reverse direction to close the shutter blades 51a and 51b. With both PF and PR signals being "0", the stepping motor 56 stops and thus the shutter blades 51a and 51b stop rotating. A shutter operation display counter 62 is set back to a count "0" when the shutter button 7 is full-depressed, and thereafter incremented by 1 each time a timer interrupt occurs, e.g. at the interval of 50 msec.

Figure 5:
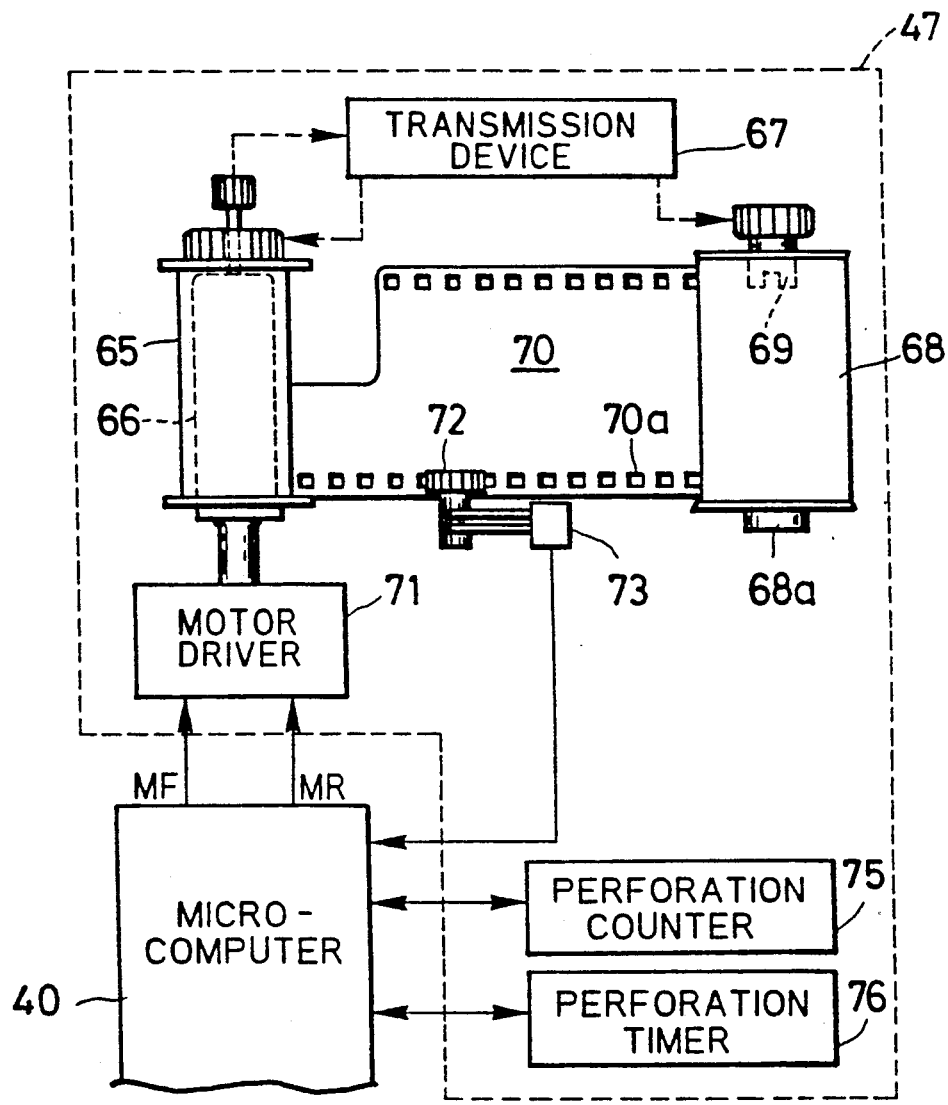
FIG. 5 is a schematic diagram showing the film transporting device.

The film transporting device 47 advances a film by one frame each time a subject is photographed, and automatically rewinds it after all frames have been used for photographing. As shown in FIG. 5, this film transporting device 47 has a motor 66 housed within a take-up spool 65 which is rotatively mounted within the camera housing 1. Rotation force of the motor 66 is transmitted to the take-up spool 65 or to a fork 69 which rotates the shaft 68a of a patrone 68, respectively via a transmission device 67. As well known, the transmission device 67 is provided with gear trains, clutches and the like so that the normal rotation of the motor 66 is transmitted to the take-up spool 65 for winding the film 70, and the reverse rotation of the motor 66 is transmitted to the fork 69 for rewinding the film 70.

The motor 66 is driven by a motor driver 71 which is supplied with a rotation control signals MF and MR from the microcomputer 40. With the MF signal being "1" and MR signal "0", the motor 66 rotates in the normal direction. With the MF signal being "0" and MR signal "1", the motor 66 rotates in the reverse direction. With both MF and MR signals being "0", it stops rotating.

Figure 6:
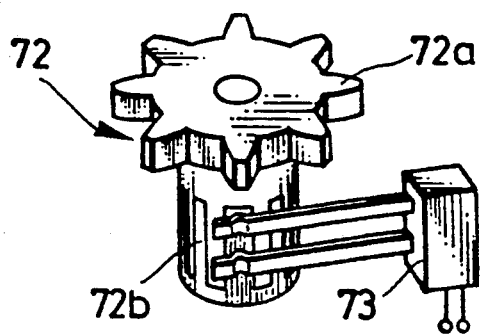
FIG. 6 is a perspective view showing an example of a slave sprocket.

A free sprocket 72 engages with perforations 70a of the film 70. As the film 70 is wound or rewound, the free sprocket 72 rotates following the film transportation. As shown in FIG. 6, the free sprocket 72 has eight teeth 72a which engage with perforations 70a, and rotates once as the film 70 is transported by one frame. The free sprocket 72 is integrally provided with eight conductive pieces 72b corresponding to the number of teeth. While the free sprocket 72 rotates once, a transportation detection switch 73 outputs eight transportation pulses with the aid of the conductive pieces 72b. These transportation pulses are supplied via the microcomputer 40 to a perforation counter 75 which counts the pulses to detect the transportation amount of the film 70. A perforation timer 76 is set at zero each time the transportation pulse is outputted, and measures the time required for the next transportation pulse to be outputted from the transportation detection switch 73, to thereby judge if the film transportation has stopped or not.

The flash unit 48 has a low brightness automatic flashing function so that a flash light of a predetermined amount is radiated from the flash emitting unit 11 upon reception of a flashing trigger signal which is outputted when a shutter speed calculated by the AE circuit 44 in accordance with a subject brightness becomes equal to or longer than a camera-shake limit value (e.g. 1/30 sec). In accordance with the subject distance data obtained by the AF device 45, the microcomputer 40 generates the flashing trigger signal at the moment when the shutter blades 51a and 51b take an aperture size corresponding to the subject distance. In this manner, a so-called flashmatic is carried out wherein the flash emitting unit 11 flashes when the shutter blades take the aperture size corresponding to the subject distance.

Figure 7:
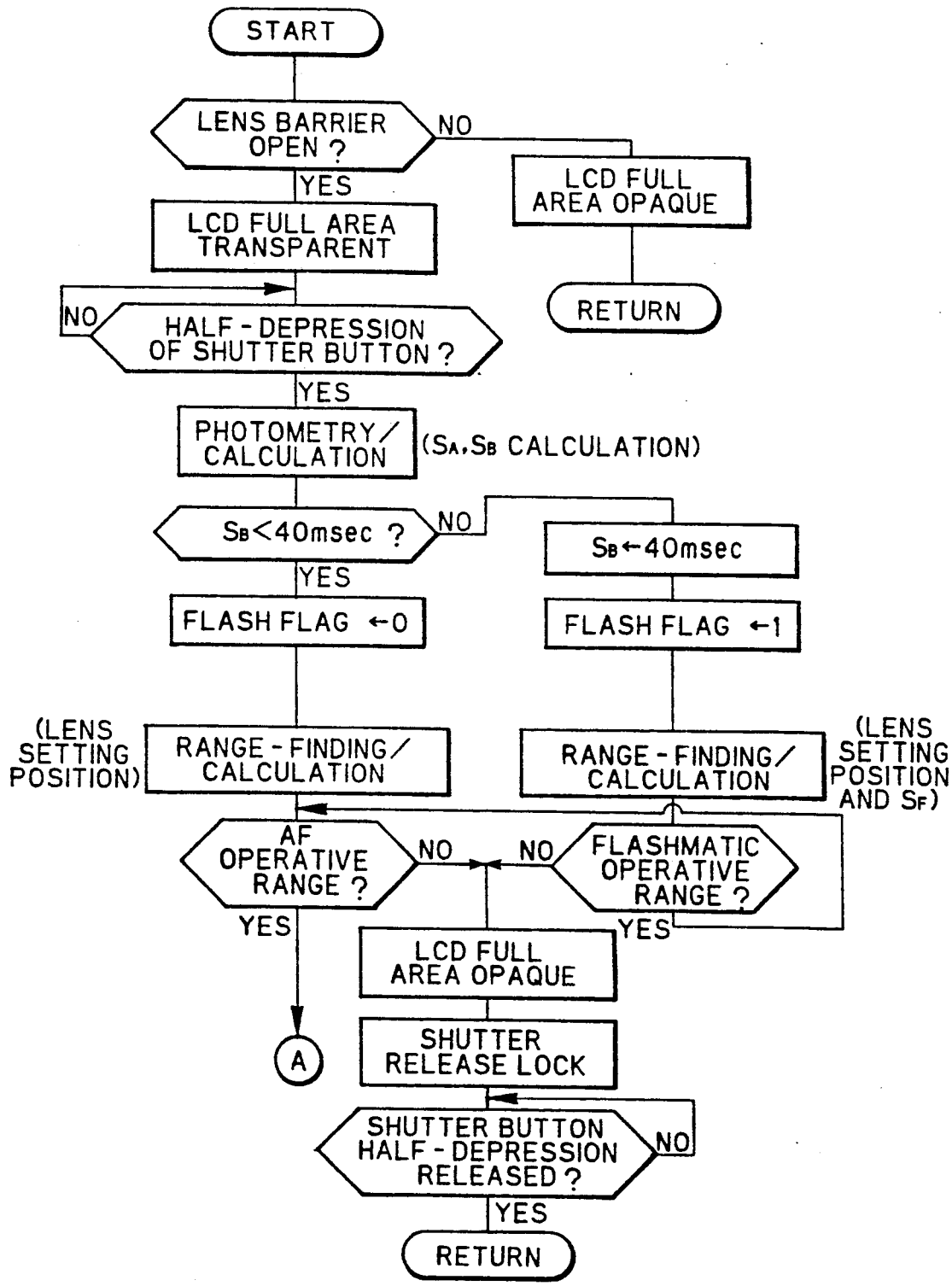
FIGS. 7 and 8 are flow charts showing the camera operation sequence.
Figure 8:
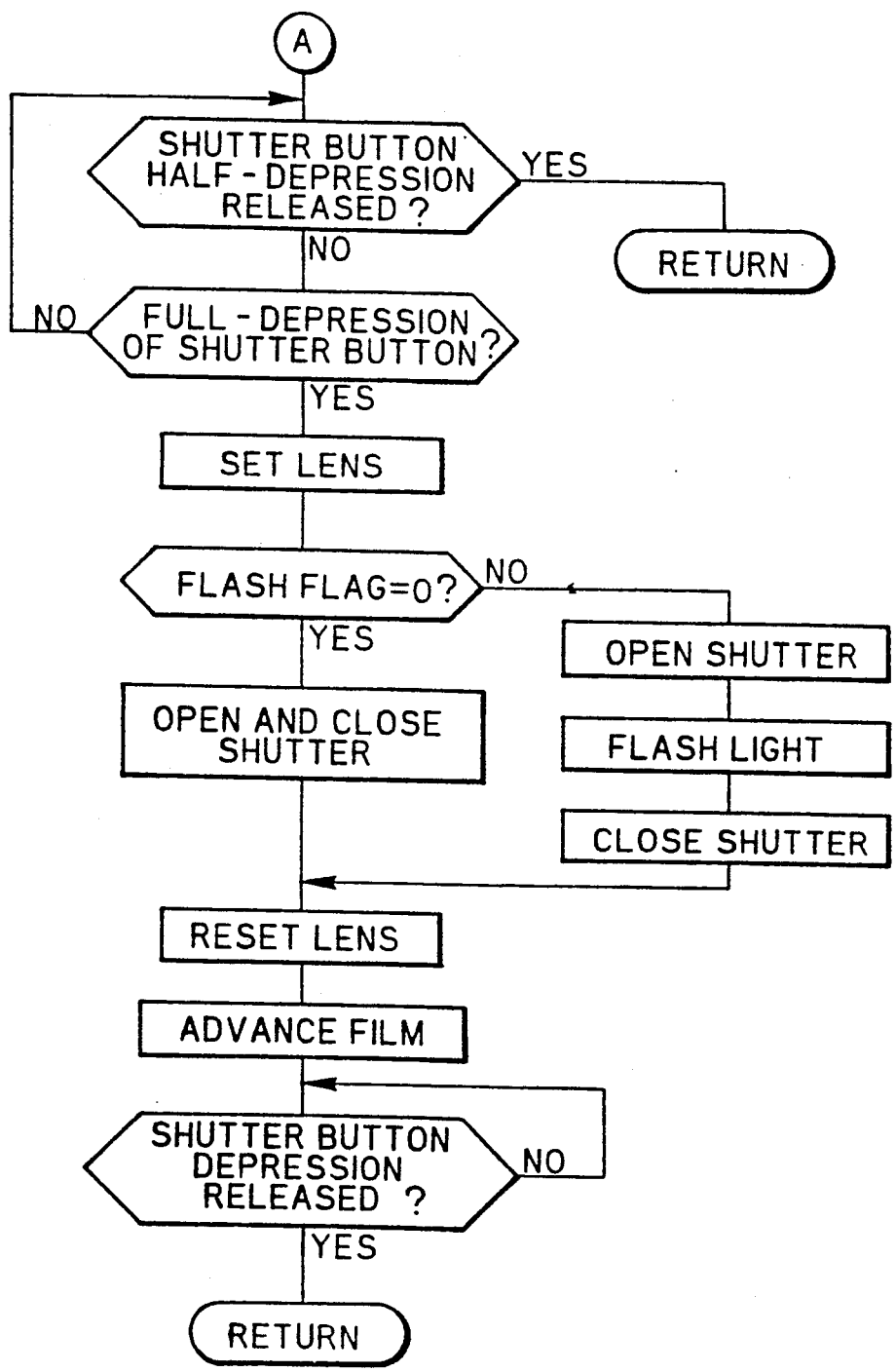
Figure 14:
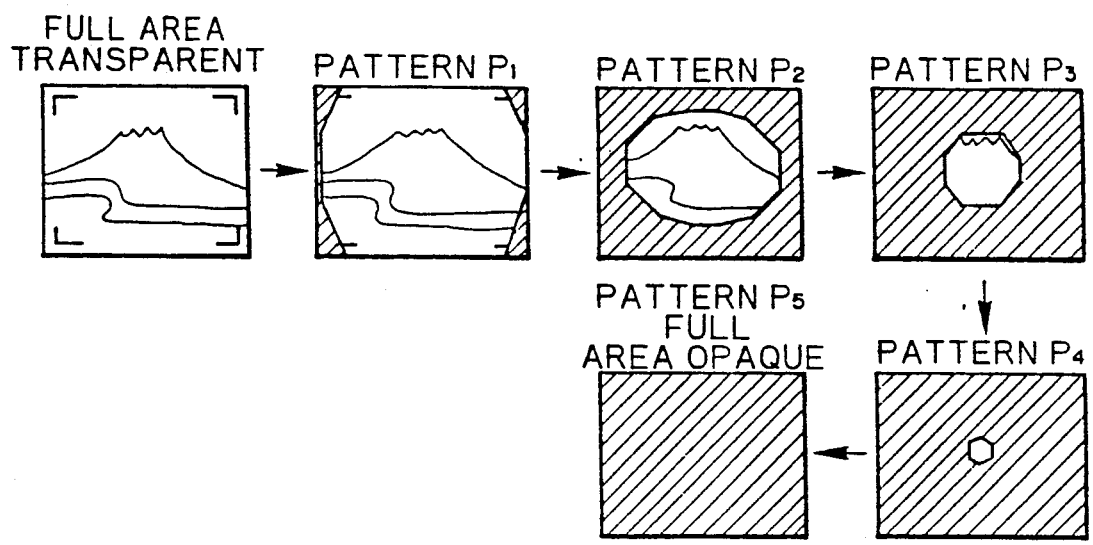
FIG. 14 illustrates display patterns for the operation of the shutter device.
Figure 15:
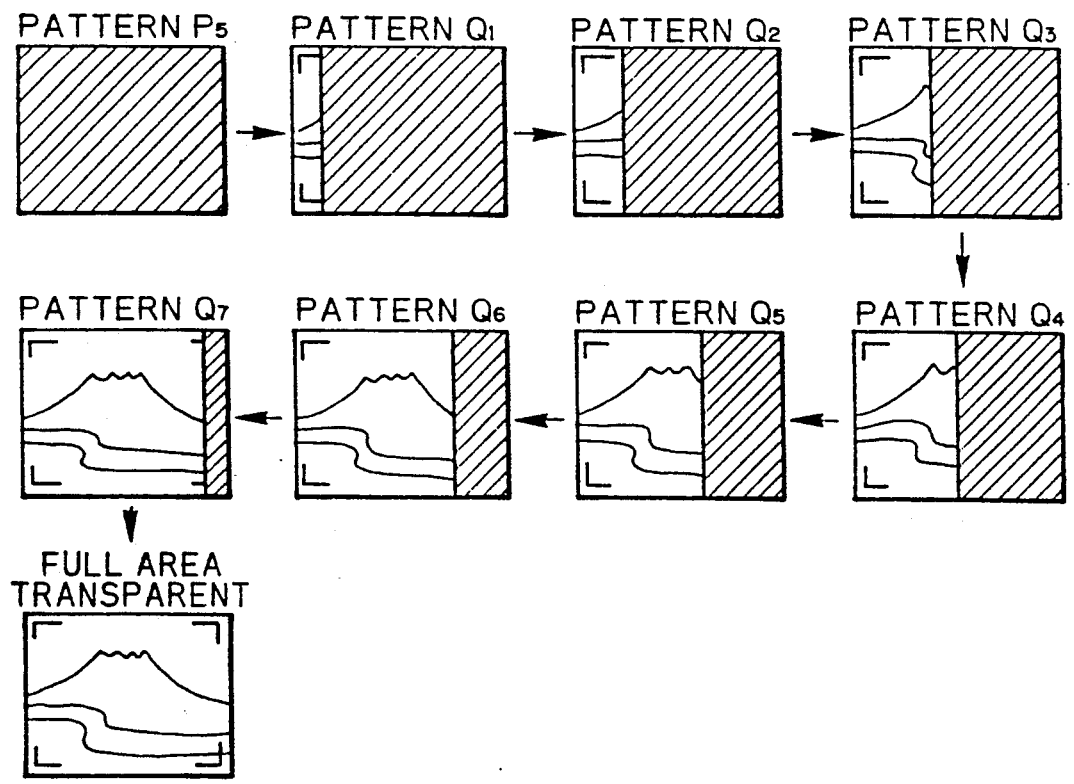
FIG. 15 illustrates display patterns for film transportation.

Next, the photographing procedure for the above-described camera will be described with reference to FIGS. 7 and 8. Referring first to FIG. 7 showing the start-up of photographing and the judgement procedure of photographing conditions, while the camera 1 is not used, the lens barriers 4 are in a closed state in an ordinary case. While the lens barriers 4 are closed, all the display segments 20a to 35a, and 20b to 35b of the liquid crystal display panel 15 are intercepted from light so that no subject can be observed through the finder. Accordingly, as shown by pattern $P_5$ in FIG. 14, the whole area of the finder optical path is made dark indicating that the camera is not allowed to take a photograph. Upon manipulation of the open/close knob 5, the lens barrier driver 42 is actuated to thereby open the lens barriers 4. When the lens barriers 4 are open completely, an ON signal from the barrier switch 6 is supplied to the microcomputer 40. The microcomputer 40 then operates the LCD driver 38 and makes all the display segments of the liquid crystal display panel 15 transparent. A finder image can therefore be observed indicating that the camera is allowed to take a photograph. The opening of the lens barriers 5 may be analogously displayed by sequentially changing the transparent patterns of the liquid crystal display panel 15 as shown in FIG. 15.

After framing an image through the finder and upon half-depressing the shutter button 7, a half-depression signal is supplied to the microcomputer 40 via the release switch mechanism 43. The microcomputer 40 then outputs an operation command signal to the AE circuit 44 which in turn measures the subject brightness, and calculates a shutter speed in accordance with the measured subject brightness and the film sensitivity. A program shutter operates either in a triangular exposure mode or a trapezoidal exposure mode. For the calculation of a shutter speed, there are calculated both a time $S_A$ while the aperture size gradually increases and a time $S_B$ while the aperture size is maintained to hold a constant size. In the triangular exposure mode, $S_B$ is equal to zero so that the aperture size during the opening operation is made larger according as the exposure time elapses until the maximum aperture size determined by the shutter speed is obtained, and thereafter the closing operation starts. In the triangular exposure mode, the relationship between time and aperture size is therefore graphically represented by a triangle. In the trapezoidal exposure mode, after holding a constant aperture size for a predetermined time, the closing operation starts so that the relationship between time and aperture size is graphically represented by a trapezoid. The calculated shutter speed data are fed back to the microcomputer 40 and stored in the RAM 49.

After the determination of the shutter speed, the microcomputer 40 refers to the shutter speed data and judges if a flash photographing is necessary. Specifically, as to the times $S_A$ and $S_B$ calculated by the AE circuit 44, if the time $S_B$ is equal to or longer than a preset value, e.g. 40 msec, it is judged that a flash photographing is necessary. In this case, although the time $S_A$ is stored as it is, the time $S_B$ is set to 40 msec. The microcomputer 40 sets a flashing flag "1" at a predetermined address in the RAM 49. If the time $S_B$ is shorter than 40 msec, the flashing flag is maintained as "0" to conduct a non-flash photographing (normal photographing).

Next, the AF device 45 operates to measure the subject distance by means of an optical trigonometrical method, the obtained distance data being written in the RAM 49. For the non-flash photographing, the microcomputer 40 judges if the subject distance indicated by the obtained distance data will result in a proper photographing. A taking lens generally has the nearest photographable distance such that a subject nearer than this distance cannot be made in-focus. In such a case, all the segments of the liquid crystal display panel 15 are made opaque and hence the finder is made dark. A user can therefore recognize indirectly that the normal photographing cannot be allowed. In addition, the shutter button 7 is locked so that no release operation is allowed.

Alternatively, for the flash photographing with the flashing flag being set to "1", the aperture size suitable for the proper exposure amount for the flash photographing is obtained in accordance with the distance data of the subject distance and the flash guide number. In accordance with the obtained aperture size, there is calculated a time $S_F$ (refer to FIG. 9) from the moment of starting the exposure to the moment the aperture size is obtained. Thereafter, it is judged if the distance data is within the flashmatic operation range. Namely, the judgement that the distance data is not within the flashmatic operation range is made when, as the distance data are equal to or larger than a distance allowable for a flash photographing of a subject, under-exposure would be made even if the flash device were operated at the maximum aperture size. In such a case, the whole area of the liquid crystal display panel 15 is made opaque presenting an alarm display of possible improper photographing. Thereafter, similar to the non-flash photographing, it is judged if the subject distance is smaller than the nearest photographable distance. If nearer than the nearest photographable distance, all the segments of the liquid crystal display panel 15 are made opaque to notify a user of the abnormal state.

If the non-flash photographing is within the AF operation range, or if the flash photographing is within the AF operation range and within the flashmatic operation range, then the photographing sequence shown in FIG.

8 proceeds. Upon full-depression of the shutter button 7, a full-depression signal is supplied from the release mechanism 43 to the microcomputer 40. The microcomputer 40 holds this full-depression signal as a release signal until the exposure is completed, and initiates the photographing sequence. At the start of the photographing sequence, the AF device 45 starts operating to effect the focal adjustment, i.e. to cause the taking lens to shift to the position corresponding to the distance data stored in the RAM 49. Next, the shutter device 46 operates to start exposing the film 70. In this case, for the non-flash photographing, the shutter speed is adjusted in accordance with the subject brightness. On the other hand, for the flash photographing, the shutter speed is fixed to a preset value so that the flash emitting unit 11 radiates a flash light at the timing corresponding to the subject distance after starting the opening operation of the shutter device 46. After completion of the photographing, the taking lens returns to its initial position, and the film transporting device 47 operates to advance the film 70 by one frame to set the next unexposed frame at the exposing stage. The operation of the shutter device and the state of film transportation are displayed on the liquid crystal display panel as will be described.

Figure 9:
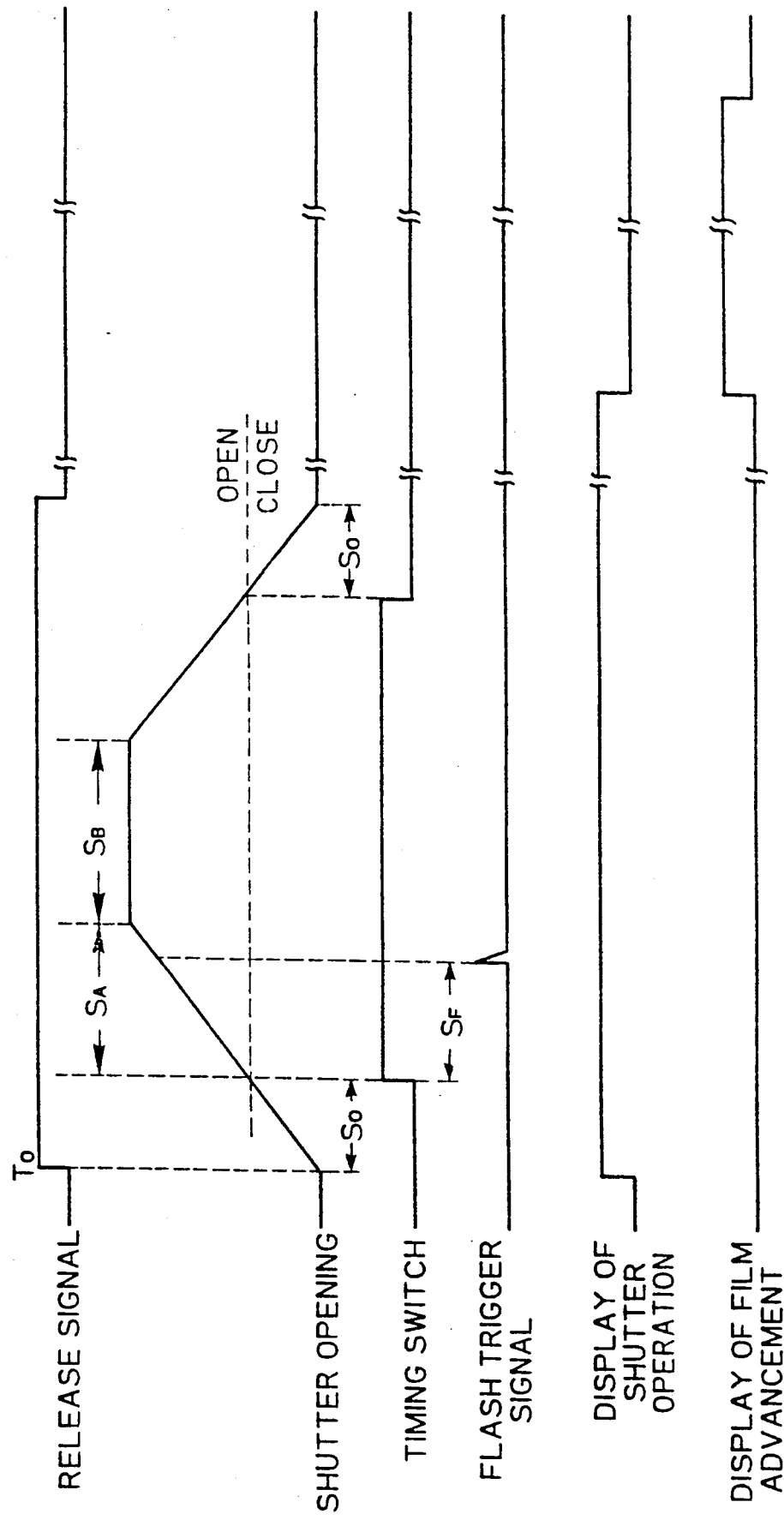
FIG. 9 is a timing chart showing the operation of the shutter device and liquid crystal display panel.
Figure 10:
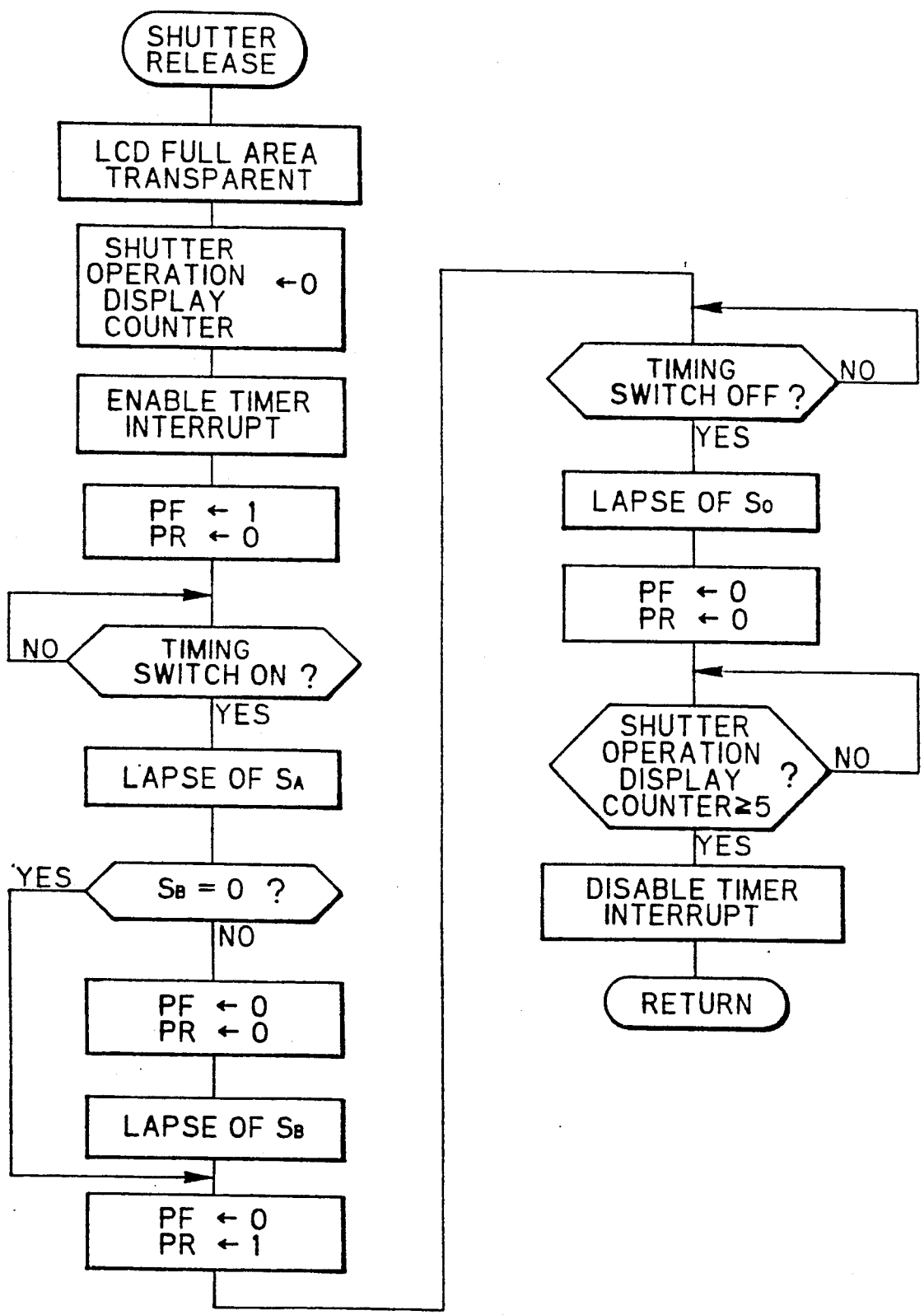
FIG. 10 is a flow chart showing the operation sequence of the shutter device.
Figure 11:
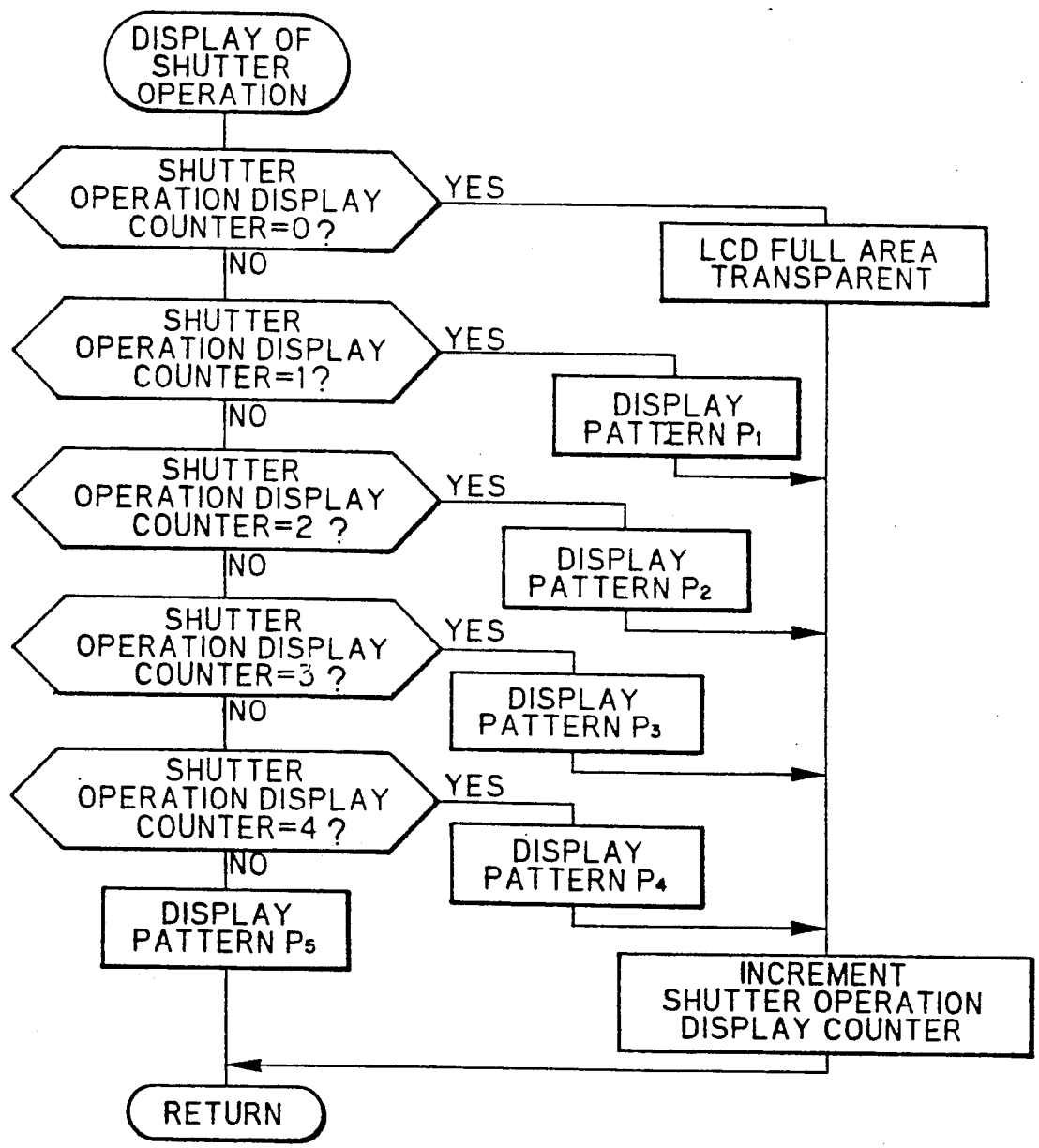
FIG. 11 is a flow chart showing the display sequence for displaying the operation conditions of the shutter device.

Next, referring to FIGS. 9 to 11, the operation of the shutter device and the display operation of the liquid crystal display panel 15 will further be detailed. Slightly before the full-depression of the shutter button 7, the whole area of the liquid crystal display panel is transparent as shown in FIG. 14 so long as the lens barriers 4 are open, so that the finder field can be observed. Upon full-depression of the shutter button 7 at time $T_0$ shown in FIG. 9, the full-depression signal is supplied to the microcomputer 40 which in turn holds it as a release signal until the exposure is completed.

Upon generation of the release signal, the shutter operation display counter 62 is set back to "0" in response to a signal from the microcomputer 40, thereby allowing a timer interrupt for the display processing. The microcomputer 40 supplies the PF signal "1" to the motor driver 60 to rotate it in the normal direction. As the stepping motor 56 rotates in the normal direction by a predetermined amount, a pin hole is formed by the shutter blades 51a and 51b to accordingly start exposing the film 70.

The timing switch 58 turns on at the moment the exposure starts. The time $S_A$ starts being measured from this moment, and during the counting operation, the stepping motor 56 continues its rotation in the normal direction. The shutter blades 51a and 51b gradually enlarge the aperture size. When the time $S_A$ elapses, the PF signal changes from "1" to "0" so that, with the PF and PR signals both being "0", the stepping motor 56 stops. At the same time, the time $S_B$ starts being measured. The shutter blades 51a and 51b maintain a predetermined aperture size until the time $S_B$ elapses, thereby conducting the exposure in the trapezoidal exposure mode. If the shutter speed data $S_B$ calculated by the AE circuit 44 is "0", measurement of the time $S_B$ is not effected, but the exposure is performed in the triangular exposure mode.

When measuring the time $S_B$ is completed, the PR signal becomes "1" so that the stepping motor 56 starts rotating in the reverse direction. The shutter blades 51a and 51b are accordingly rotated in the direction of closing them. At the moment the timing switch 58 turns off, the exposure is completed. After the timing switch 58 turns off, the stepping motor 56 still rotates for a time $S_0$. When the PR signal also becomes "0" thereafter, the shutter blades 51a and 51b restore the initial state.

If the flashing flag is "1", the shutter blades 51a and 51b open to the maximum aperture size, remain at this state for 40 msec, and then close. During this opening operation, the flashing trigger signal is outputted from the microcomputer 40 to the flash device 48. This flashing trigger signal is generated at the timing when the time $S_F$ elapses after the timing switch 58 has turned on. The time $S_F$ is determined in accordance with the subject distance.

While the stepping motor 56 is driven, the timer interrupt processings are repeated every 50 msec with the shutter operation display counter 62 being incremented at every timer interrupt. When the count value reaches "5", the timer interruption is inhibited. During the course of incrementing the count value of the shutter operation display counter 62, the liquid crystal display panel 15 displays patterns for the respective count values as shown in FIG. 14. The pattern $P_1$ is obtained by making the display segments 20a, 20b, 22a, and 22b opaque. The pattern $P_2$ is obtained by making further the display segments 21a, 21b, 23a, 23b, 25a, 25b, 26a, 26b, 29a, 29b, 30a, 30b, 35a, and 35b opaque. The patterns $P_3$ and $P_4$ are obtained in the similar manner by making additional display segments opaque. As appreciated from the change in displayed patterns as shown in FIG. 14, the closing operation of the shutter device is analogously displayed. The operation display and the inhibition display of release operation, respectively of the shutter device 46 are effected by definitely making the finder optical path to be light-intercepted. This is advantageous in that a user can visually recognize such displays very easily and that the space for displays is considerably reduced.

Figure 12:
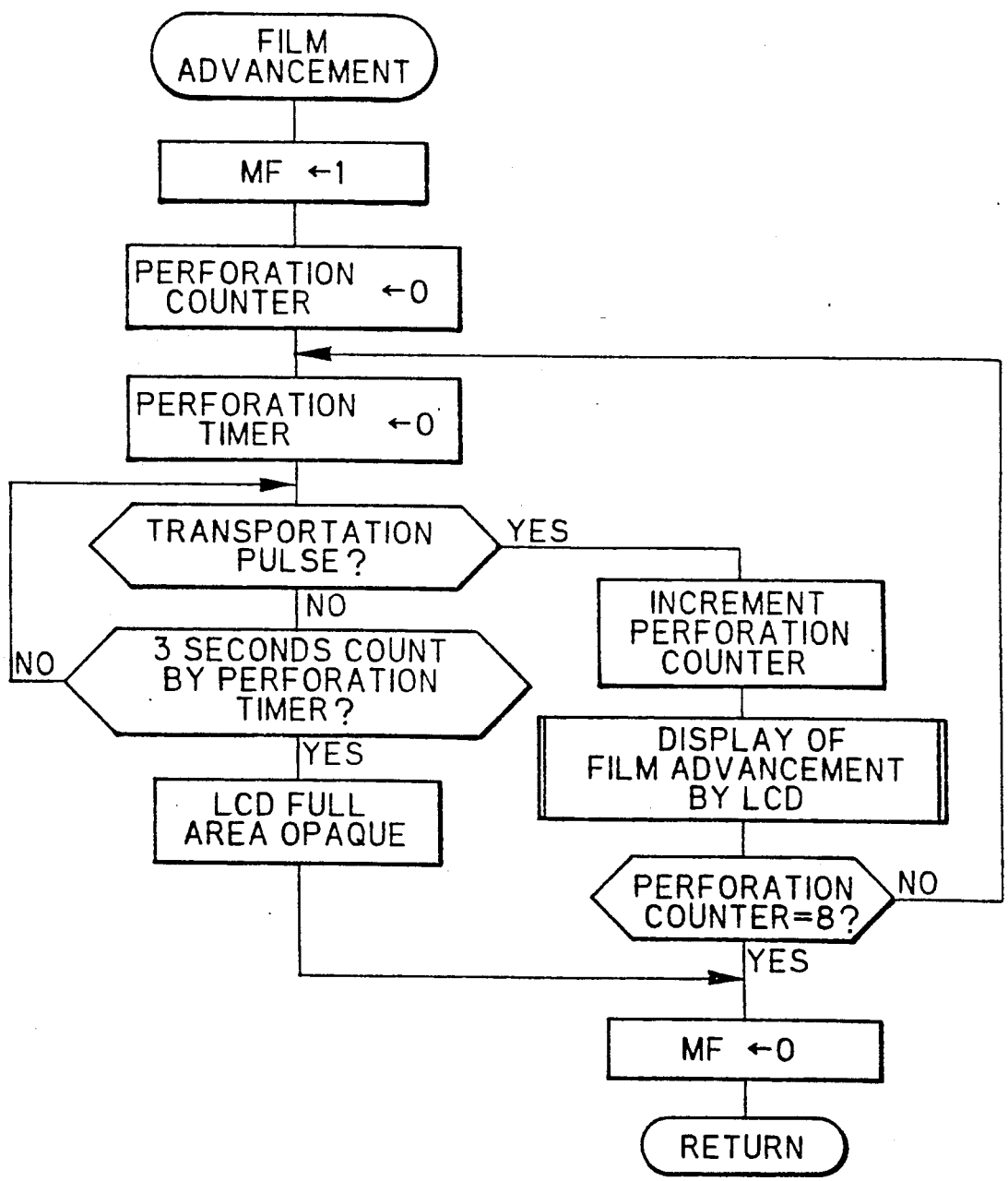
FIG. 12 is a flow chart showing the operation of the film transporting device.

After the operation of the shutter device 46, the film is transported by the film transporting device 47, and the film transportation is analogously displayed on the liquid crystal display panel 15. Advancement of the film by one frame is performed by the film transporting device 47 in the manner as shown in the flow chart of FIG. 12. When an exposure completion signal is sent from the shutter device 46 to the microcomputer 40, the MF signal "1" is supplied from the motor driver 71 to the microcomputer 40. The count values of the perforation counter 75 and perforation timer 76 are cleared to "0".

When the MF signal becomes "1", the motor driver 71 causes the motor 66 to start rotating in the normal direction. The film 70 is then transported in the winding-up direction and the free sprocket 72 follows its movement. As the free sprocket 72 rotates, the contact of the transportation detection switch 73 becomes in contact with the conductive piece 72b, and the transportation detection switch 73 outputs transportation pulses which is counted via the microcomputer 40 at the perforation counter 75. The transportation display, to be described later, is performed in accordance with the count value. When the count value of the perforation counter 75 reaches "8", the MF signal changes from "1" to "0" and the normal rotation of the motor 66 stops. In the above manner, the film 70 is transported by one frame and prepares for the next photographing.

If the perforation timer 76 detects that the transportation pulse has not been supplied e.g. for more than 3 sec after the motor 66 starts rotating in the normal direction, it means that the film winding is not possible. In such a case, the whole area of the liquid crystal display panel 15 is made opaque. If the microcomputer 40 judges, for example by referring to the value of the film counter, that all frames of the film 70 have been photographed, the film rewinding automatically starts. For a camera which is not equipped with an automatic rewinding mechanism, the end of the photographing may be judged from the display on the liquid crystal display panel 15 and the value of the film counter, and the film rewinding may be performed by manipulating a rewinding switch.

Figure 13:
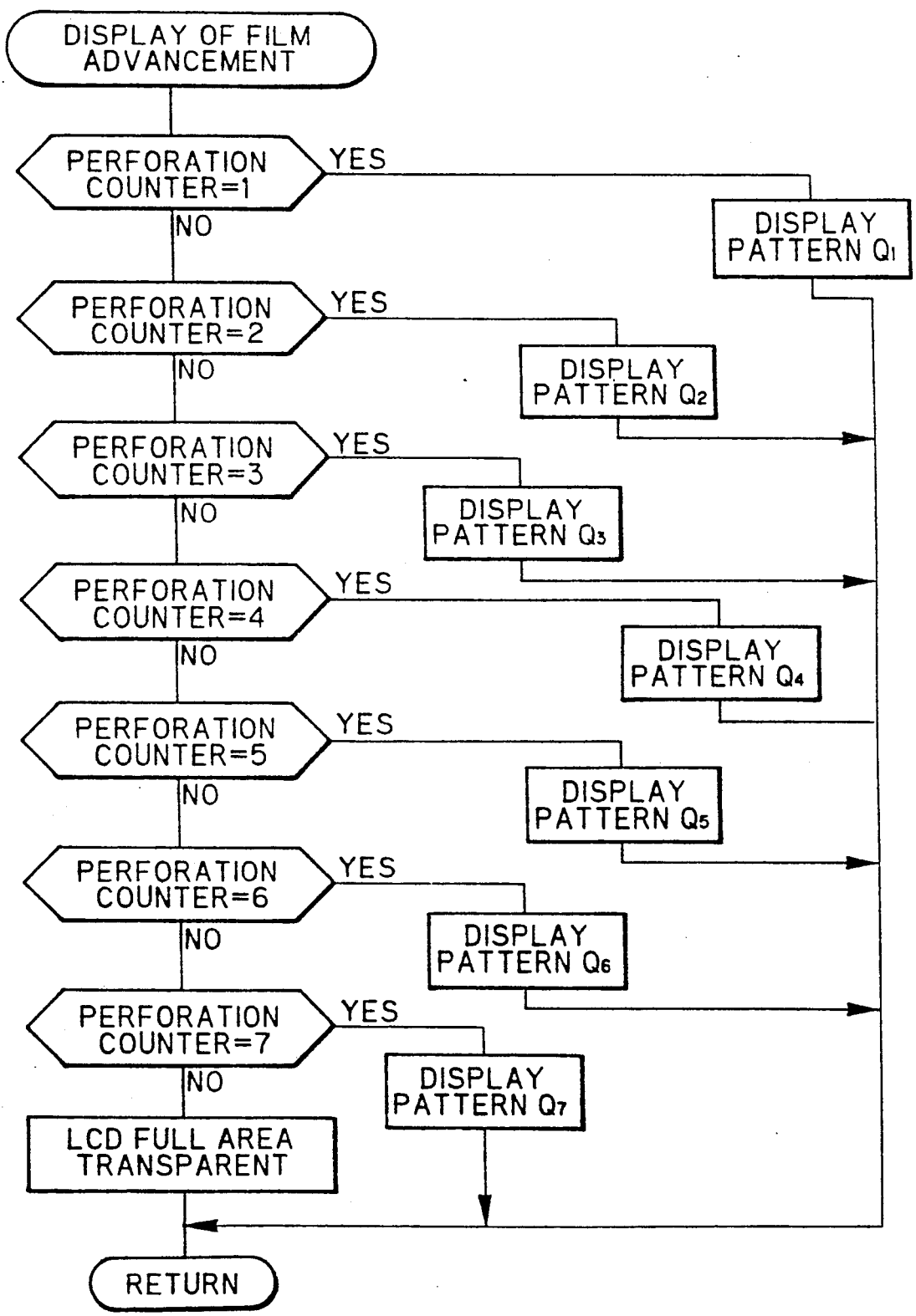
FIG. 13 is a flow chart showing the processing of displaying film transportation.

The flow chart shown in FIG. 13 illustrates the display processing for film transportation, wherein the display patterns shown in FIG. 15 are displayed on the liquid crystal display panel 15 in correspondence with the count values of the perforation counter 75. Specifically, as the film 70 is transported, the transparent area within the finder frame becomes larger, and the whole area becomes transparent when one frame is completely transported. In the above manner, during photographing, the liquid crystal display panel 15 changes its state from the transparent state to the opaque state as shown in FIG. 14. Thereafter, as the film transportation device 47 operates, the liquid crystal display panel 15 changes its state from the opaque state to the transparent state as shown in FIG. 15. At this stage, the whole image within the finder can be observed, thereby indirectly notifying a user of a possibility of the next photographing.

Figure 16:
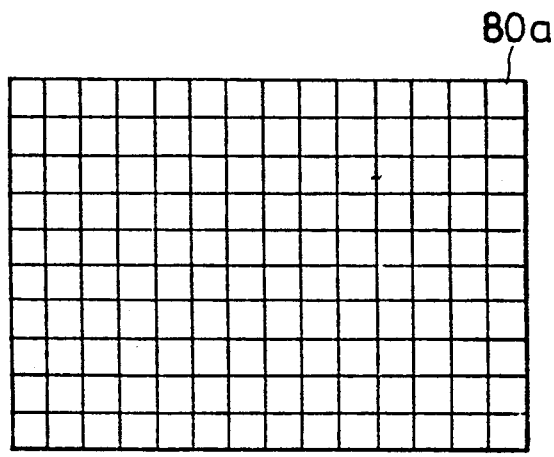
FIG. 16 illustrates another embodiment of the liquid crystal display panel.

As the shapes of display segments of the liquid crystal display panel 15, fine display segments 80a disposed in matrix may be used as shown in FIG. 16. For the display of film transportation, a vertical stripe extending over the full height of the finder frame and having a predetermined width may be moved from the left to the right as the film is transported, or the upper or lower half of the finder frame may be made to gradually have a larger transparent area as the film is transported.

In the above embodiment, the liquid crystal display panel 15 is constructed of a plurality of display segments in order to provide a display simulating the shutter operation and film transportation. If only the range out of AF operation or out of flashmatic only is to be displayed within the finder, a single liquid crystal display segment may be used traversing at least a partial area of the finder optical path. For the type of displaying images, the complete opaque state is not necessarily required, but semi-transparent or winking display may also be used instead. Further this invention may use electro-optical devices other than a liquid crystal, such as PLZT, electro-luminescence device changing the color of a transmitted light by changing the transmittance of a specific wavelength, and the like. Furthermore, the finder optical system mounted with such a display panel is not limited to a real image type only.

Although the present invention has been fully described in connection with the preferred embodiment thereof with reference to the accompanying drawings, it will be apparent to those skilled in the art that various changes and modifications of the present invention are possible within the scope of the following claims.

I claim:

1. A display device for a camera, comprising
a finder for observing a subject to be photographed;
an electro-optical display panel whose light transmittance changes with application of an electric signal, said electro-optical display panel being disposed within said finder so as to constitute at least a partial view area in an optical path of said finder; and
control means for supplying said electric signal to said electro-optical display panel in order to switch said electro-optical panel between a first condition in which the panel is either continuously light intercepting or winking by being periodically switched between light transmitting and light intercepting states while a lens barrier for covering a taking lens of the camera is closed and a second condition in which the panel is in a continuously light transmitting state while said lens barrier is open.

2. A display device for a camera according to claim 1, wherein said electro-optical display panel is disposed within said finder optical path so as to constitute the whole view area across said finder optical path.

3. A display device for a camera according to claim 2, wherein said electro-optical display panel is a liquid crystal display panel.

4. A display device for a camera, comprising: a finder for observing a subject to be photographed; an electro-optical display panel whose light transmittance changes with application of an electric signal, said electro-optical display panel being disposed within said finder so as to constitute the whole view area across an optical path of said finder;
control means for supplying said electric signal to said electro-optical display panel in order to switch said electro-optical display panel between first and second display modes in accordance with a subject distance measured with an automatic focussing device; and
said electro-optical display panel being set at said first display mode to allow observation through said finder with said electro-optical display panel transparent if said subject distance is longer than a shortest distance at which the focussing of a taking lens of said camera is ensured, and said electro-optical display panel being set at said second display mode to disturb observation through said finder if said subject distance is shorter than said shortest distance.

5. A display device for a camera according to claim 4, wherein during said second display mode said electro-optical display panel is in a light intercepting state.

6. A display device for a camera according to claim 4, wherein during said second display mode said electro-optical display panel repeatedly winks between a light transmitting state and a light intercepting state.

7. A display device for a camera, comprising:
a finder for observing a subject is to be photographed;
an electro-optical display panel whose light transmittance changes with application of an electric signal, said electro-optical display panel being disposed within said finder so as to constitute the whole view area across an optical path of said finder;
control means for supplying said electric signal to said electro-optical display panel in order to switch said electro-optical display panel between first and second display modes in accordance with a subject distance for a flash photographing; and
said electro-optical display panel being set at said first display mode to allow observation through said finder with said electro-optical display panel transparent if said subject distance is within a distance range by which a proper exposure for a flash photographing can be obtained, and said electro-optical display panel being set at said second display mode to disturb observation through said finder if said subject distance is beyond said distance range.

8. A display device for a camera according to claim 7, wherein said subject distance is measured with an automatic focussing device prior to photographing.

9. A display device for a camera according to claim 8, wherein during said second display mode said electro-optical display panel is in a light intercepting state.

10. A display device for a camera according to claim 8, wherein during said second display mode said electro-optical display panel repeatedly winks between a light transmitting state and a light intercepting state.

11. A display device for a camera, comprising:
a finder for observing a subject to be photographed;
an electro-optical display panel disposed within said finder so as to constitute the whole view area across an optical path of said finder, said electro-optical display panel having a plurality of display segments whose light transmittance changes with application of an electric signal; and
control means for applying said electric signal to said display segments selectively in accordance with a display pattern; said control means, on operation of a shutter device, gradually changing said display pattern between first and second conditions wherein in said first condition all of said display segments are in continuous or light transmitting state and in said second condition they are in a light intercepting state or winking between light transmitting and light intercepting states.

12. A display device for a camera according to claim 11, wherein said display segments are disposed in such a pattern as to vertically partition said electro-optical display panel being rectangular.

13. A display device for a camera according to claim 11, wherein said display segments are disposed in such a pattern as to partition said electro-optical display panel being rectangular into a plurality of concentric ellipses.

14. A display device for a camera according to claim 11, wherein said finder is a real image finder.

15. A display device for a camera, comprising:
a finder for observing a subject to be photographed;
an electro-optical display panel disposed within said finder so as to constitute the whole view area across an optical path of said finder, said electro-optical display panel having a plurality of display segments whose light transmittance changes with application of an electric signal; and
control means for applying said electric signal to said display segments selectively in accordance with a display pattern, wherein said control means selects one of first to fourth display modes, wherein during said first display mode said display pattern holds a first condition with all of said display segments in a light transmitting state, during said second display mode said display pattern holds a second condition with all of said display segments in a light intercepting or winking state, during said third display mode said display pattern gradually changes from said first condition to said second condition, and during said fourth display mode said display pattern gradually changes from said second condition to said first condition.

16. A display device for a camera according to claim 15, wherein said display segments are disposed in such a pattern so as to partition said electro-optical display panel being rectangular into a plurality of concentric ellipses and columns, during said third display mode display pattern changes with reference to said respective ellipses sequentially so as to enlarge an opaque part of said view area, and during said fourth display mode said display pattern changes with reference to said respective columns sequentially so as to enlarge a transparent part of said view area.

17. A display device for a camera according to claim 16, wherein said first display mode is used for displaying a photographing enabled state, said second display mode is used for effecting an alarm display, said third display mode is used for displaying an operation of a shutter device, and said fourth display mode is used for displaying a state of one frame transportation of film.

18. A for a camera according to claim 17, wherein said alarm display is performed for any one of the cases where a lens barrier for covering a taking lens is closed, where a flash photographing using a flash device will not be carried out properly, and where the focal adjustment with an automatic focussing device cannot be executed properly.

19. A display device for a camera, comprising:
a finder for observing a subject to be photographed;
an electro-optical display panel disposed within said finder so as to constitute the whole view area across an optical path of said finder, said electro-optical display panel having a plurality of display segments whose light transmittance changes with application of an electric signal; and
control means for applying said electric signal to said display segments selectively in accordance with a display pattern; said control means, associated with a transportation of a film, gradually changing said display pattern between first and second conditions wherein in said first condition all of said display segments are in a light transmitting state and in said second condition they are in a light intercepting state or winking between light transmitting and light intercepting states.

20. A display device for a camera according to claim 19, wherein said display segments are disposed in such a pattern as to vertically partition said electro-optical display panel being rectangular.

21. A display device for a camera according to claim 19, wherein said display segments are disposed in such a pattern as to partition said electro-optical display panel being rectangular into a plurality of concentric ellipses.

22. A display device for a camera according to claim 19, wherein said finder is a real image finder.

23. A display device for a camera, comprising:
a finder for observing a subject to be photographed;
an electro-optical display panel disposed within said finder so as to constitute the whole view area across an optical path of said finder, said electro-optical display panel having a plurality of display segments whose light transmittance changes with application of an electric signal; and
control means for applying said electric signal to said display segments selectively in accordance with a display pattern, wherein said control means selects either a first or second display mode, said first display mode being used for displaying an operation of a shutter device wherein said display pattern gradually changes from a first condition to a second condition, said second display mode being used for displaying a transportation of a film after said shutter operation wherein said display pattern gradually changes from said second condition to said first condition, and all of said display segments under said first condition being in a light transmitting state, and under said second condition being in a light intercepting or winking state.

24. A display device for a camera according to claim 23, wherein said display segments are disposed in such a pattern as to partition said electro-optical display panel being rectangular into a plurality of concentric ellipses and columns, during said first display mode said display pattern changes with reference to said respective ellipses sequentially so as to enlarge an opaque part of said view area, and during said second display mode said display pattern changes with reference to said respective columns sequentially so as to enlarge a transparent part of said view area.

25. A display device for a camera, comprising:
a finder for observing a subject to be photographed;
an electro-optical display panel disposed within said finder so as to constitute the whole view area across an optical path of said finder, said electro-optical display panel having a plurality of display segments whose light transmittance changes with application of an electric signal; and
control means for applying said electric signal to said display segments selectively in accordance with a display pattern; said control means, associated with a transportation of a film, gradually changing said display pattern so as to move a stripe displayed by display segments in a light intercepting or winking state in a widthwise direction of said stripe.

26. A display device for a camera according to claim 25 wherein said stripe extends vertically over said display panel.

* * * * *

UNITED STATES PATENT AND TRADEMARK OFFICE
CERTIFICATE OF CORRECTION

PATENT NO. : 5,148,202
DATED : September 15, 1992
INVENTOR(S) : Yoshida

It is certified that error appears in the above-indentified patent and that said Letters Patent is hereby corrected as shown below:

On the Title page, item [75], inventor: should be --Yutaka Yoshida--.

Column 12, Claim 18, line 1, after "A", insert --display device--.

Signed and Sealed this

Nineteenth Day of October, 1993

Attest:

BRUCE LEHMAN

*Attesting Officer*  *Commissioner of Patents and Trademarks*